United States Patent [19]
Murrah

[11] Patent Number: 5,691,684
[45] Date of Patent: Nov. 25, 1997

[54] ARTICLE STORAGE CONTAINER WITH BAR CODE SCANNING

[75] Inventor: Judy Murrah, St. James, N.Y.

[73] Assignee: Symbol Technologies, Inc., Holtsville, N.Y.

[21] Appl. No.: 530,806

[22] Filed: Sep. 20, 1995

[51] Int. Cl.⁶ .................. G06F 17/60; F25D 23/00
[52] U.S. Cl. .......................... 235/385; 235/462
[58] Field of Search ...................... 235/375, 385, 235/462

[56] References Cited

U.S. PATENT DOCUMENTS

| 3,836,755 | 9/1974 | Ehrat | 235/61.7 R |
| 4,323,773 | 4/1982 | Carpenter | 235/473 |
| 4,780,588 | 10/1988 | Edamura | 219/10.55 B |
| 4,812,985 | 3/1989 | Hambrick et al. | 235/385 |
| 4,814,592 | 3/1989 | Bradt et al. | 235/385 |
| 4,839,875 | 6/1989 | Kuriyama et al. | 235/385 |
| 5,047,614 | 9/1991 | Bianco | 235/385 |
| 5,141,078 | 8/1992 | Bridges | 235/385 |
| 5,243,655 | 9/1993 | Wang | 380/51 |
| 5,304,786 | 4/1994 | Pavlidis | 235/462 |
| 5,510,606 | 4/1996 | Worthington et al. | 235/472 |

FOREIGN PATENT DOCUMENTS

| 4169773 | 6/1992 | Japan . |
| 4295584 | 10/1992 | Japan . |
| 4347484 | 12/1992 | Japan . |
| 5288456 | 11/1993 | Japan . |

Primary Examiner—Donald T. Hajec
Assistant Examiner—Mark Trembley

[57] ABSTRACT

A method for on-premise processing of articles such as food items bearing linear or two-dimensional bar code symbols comprises the steps of defining an on-premise storage unit such as a refrigerator or pantry for releasable storage of the articles, scanning and storing the bar codes of articles entering and withdrawn from the storage unit, scanning and storing the bar codes of articles returned to the storage unit following the withdrawal thereof from the storage unit and providing output indication of failure of correspondence of storage of stored bar codes in the steps of entry and withdrawal scanning and return scanning. A "shopping list" or inventory readout is obtainable from the failures of correspondence. Methods are provided also for processing two-dimensional bar codes symbols wherein messages encoded therein are selectively audibilized in connection with a refrigerator or pantry.

3 Claims, 9 Drawing Sheets

ARTICLE STORAGE CONTAINER WITH BAR CODE SCANNING

FIELD OF THE INVENTION

This invention relates generally to article containers such as kitchen appliances employing systems and methods for assisting consumers in inventory control and use of food items, staples and like merchandised articles and pertains more particularly to the inventory control and use of staples and like merchandised articles through scanning of one-dimensional or two-dimensional bar codes.

BACKGROUND OF THE INVENTION

Automated supermarket checkout of merchandised articles based on scanning of linear (one-dimensional) bar codes such as UPCs (universal product codes) affixed to articles is of course commonplace. Such known practices typically involve a bar code scanner at a checkout station and resort to price lookup tables having prices stored jointly with UPCs to furnish a POS (point of sale) display to indicate to the purchaser, per article UPC scanned, of the article and its price. Known practice is also to totalize purchase costs based on the UPC scanning, to display totalized purchase cost, to provide a printout of transactions, and to control inventory on the basis of UPC scanning. In the last respect, a supermarket facility may include an inventory store containing required numbers of given articles and processing means adapted to print out an effective order list for the supermarket based on printout of the required numbers of articles less those purchased and thus no longer at hand.

The art has, indeed, looked the shopper/purchaser as the input source of such information. For example, Ehrat U.S. Pat. No. 3,836,755 discloses a shopping cart equipped with a UPC scanner in communication with checkout stations and supermarket host computers addressing inventory. Further, the prior art has looked to fully automated merchandising facilities, i.e., operator-unattended, wherein the shopper/purchaser, without a clerk in attendance at a checkout station, scans article UPCs with the foregoing events attending proper scanning, i.e., price display, price totalization and inventory control based on the UPC scanning.

The art has further addressed events preliminary to the shopper/purchaser entering the supermarket, e.g., in the nature of assisting the person, through a home-based UPC scanner, in preparing "shopping lists". Thus, Bianco U.S. Pat. No. 5,047,614 discloses an arrangement wherein a consumer is provided with a hand-held UPC scanner for use at the consumer's home. A pamphlet is provided which displays identification of articles available at the supermarket along with their UPC codes. The consumer scans the bar codes of articles needed from the supermarket, either from the pamphlet or directly from the article, particularly when it has been consumed and is being discarded.

The consumer's scanner has a memory which contains entered bar codes and the scanner is taken to the supermarket and its memory is read, providing the consumer with a shopping list. Bianco looks further to providing a shopping list which includes quantity, location and price and is arranged so that items listed thereon are sequenced such that the customer will take a preferred route through the store when selecting the items for purchase.

U.S. Pat. Nos. 5,243,655 and No. 5,304,786, owned by the assignee of the instant application and which are incorporated herein by this reference thereto, disclose PDF417, which is a data rich two dimensional symbology. Briefly, that symbology involves a variable number of component symbols or "codewords" per row of a nonvolatile electro-optical read-only memory imprinted on a substrate. Codewords in alternating rows are selected from mutually exclusive subsets of a mark pattern, the subsets being defined in terms of particular values of a discriminator function which is illustrated in the referenced patents as being a function of the widths of bars and spaces in a given codeword. The two-dimensional symbology enables quite high density encoding and consequent substantial expansion of readable data.

SUMMARY OF THE INVENTION

The present invention has as its primary object the provision of article containers such as kitchen appliances implementing systems and methods for consumer's inventory control and use of food items, staples and like merchandised articles.

Specific objects of the present invention are to provide linear bar code and PDF-enhanced control of refrigerators and pantries and like article containing facilities, shopping list preparation and home inventory control.

An outset observation of applicant in respect of control of refrigerators and pantries and like article containing facilities, shopping list preparation and home inventory control is that, contrary to the prior art systems and methods above alluded to, home usage of articles, unlike supermarket purchase thereof, does not necessarily give rise to stock depletion and need for inventory updating. Thus, it is noted that an on-premise article is only to be recognized as depleted when the article, once taken from a storage unit, e.g., a refrigerator or pantry, is not returned thereto.

A further observation of applicant is that certain discipline need attend home processing of articles, namely, certain participation of the consumer need be compelled, as below discussed.

In achieving the aforesaid and other objects in respect of linear bar code scanning, applicant provides the on-premise storage unit with a bar code scanner as part of their system. Memory is employed to store UPCs of articles removed from the on-premise storage unit and of UPCs of articles returned to the on-premise storage unit. Processing facility is provided for noting, upon consumer demand, or at selected time periods, e.g., weekly shopping time periods, articles removed from the on-premise storage unit and articles not thereafter returned to the on-premise storage unit. So-noted articles are identified as inventory "shorts" and/or as shopping list candidates.

In attaining the foregoing and other objects, the invention broadly provides a method for on-premise processing of articles bearing bar codes, the method comprising the steps of defining an on-premise storage unit for releasable storage of the articles, scanning and storing the bar codes of articles entering and withdrawn from the storage unit, scanning and storing bar codes of articles returned to the storage unit following the withdrawal thereof from the storage unit and providing output indication of failure of correspondence of storage of stored bar codes in the steps of entry and withdrawal scanning and return scanning.

More particularly, a method in accordance with the invention on-premise processing of articles bearing bar codes comprises the steps of defining an on-premise unit for releasable containment of the articles, scanning and storing the bar codes of articles on initial entry thereof into the on-premise unit, scanning and storing the bar codes of articles withdrawn from the on-premise unit, scanning and storing the bar codes of articles entered into the on-premise unit following the withdrawal thereof from the on-premise unit and providing output indication of failure of correspondence of storage of stored resulting from commodity entry and withdrawal.

The storing steps are practiced by providing separate storage facilities for scanned bar codes respectively in article entry and withdrawal. Failures of correspondence of storage of stored bar codes resulting from article entry and withdrawal are obtained by a comparison of contents of the respective storage facilities.

The method further involves steps of sensing withdrawal of previously scanned encoded articles from a storage unit, forcing bar code scanning of the withdrawn encoded articles, sensing entry of encoded articles into the storage unit and forcing bar code scanning of the entered encoded articles.

Systems for implementing such methods of the invention are also delineated.

Applicant looks further to the use of two-dimensional encoding of articles, whereby the article may have in its readable, encoded data information with respect to such matters as article expiration date and audibilizable messages concerning articles, such as vocal announcement of expiration dates and/or article depletion.

In this connection, applicant provides, in combination, an on-premise unit for releasable containment of articles bearing two-dimensionally encoded bar code symbols, scanning means disposed with the on-premise unit for reading the article bar codes and providing output signals indicative of the article bar codes and decoding means with the on-premise unit for decoding the output signals of the scanning means and providing decoding means output signals. Processing means are further included with the on-premise unit for processing the decoding means output signals and providing processing means output signals, and annunciator means with the on-premise unit for providing audible messages upon receipt of the processing means output signals.

The foregoing and other objects and features of the invention will be further understood from the following detailed description of preferred practices and embodiments thereof and from the drawings wherein like reference numerals identify like parts throughout.

DETAILED DESCRIPTION OF PREFERRED EMBODIMENTS AND PRACTICES

Figure 1:
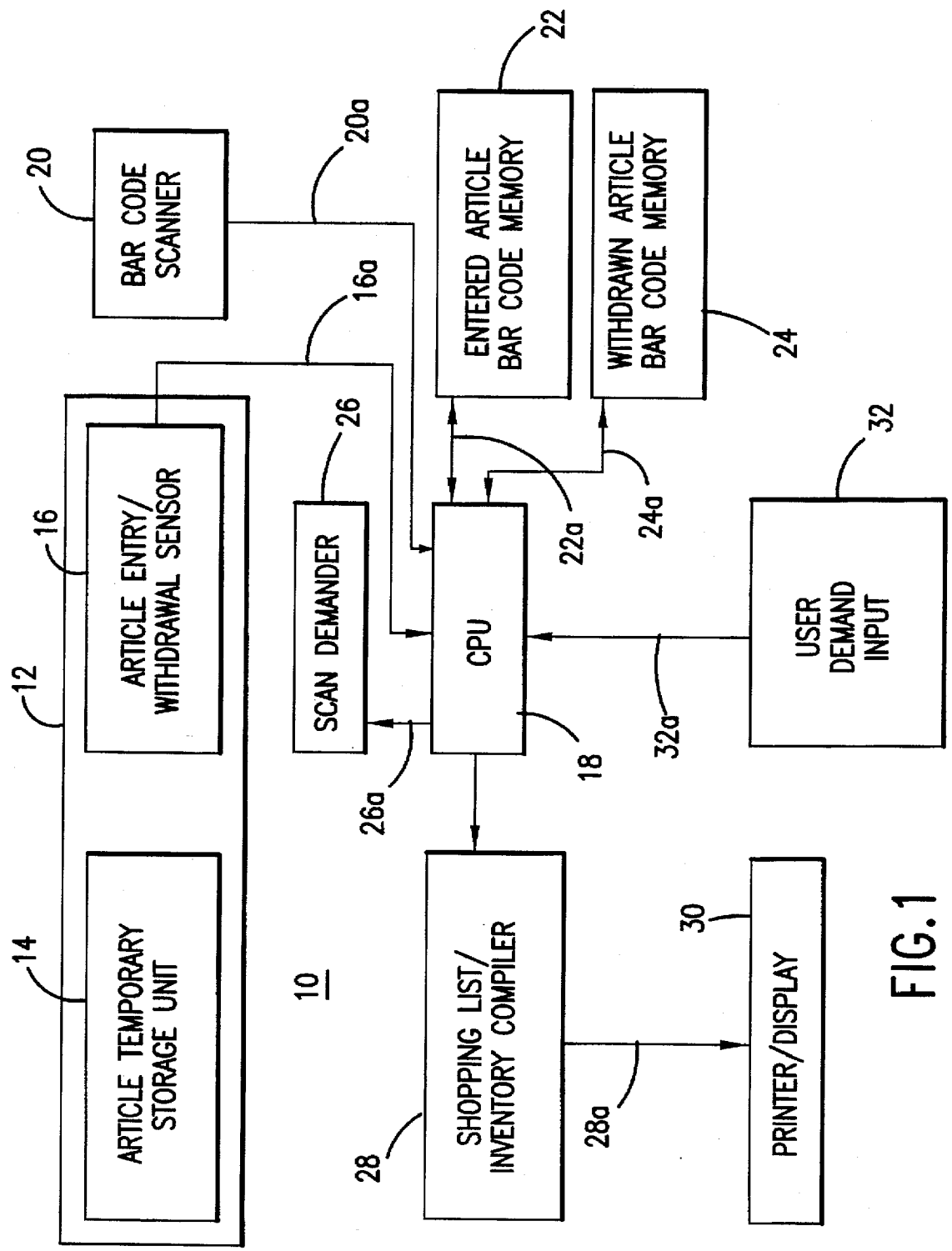
FIG. 1 is a functional block diagram of a system in accordance with the invention.

Referring to FIG. 1, system 10 includes a refrigerator, pantry or the like identified by the reference numeral 12 and having ARTICLE TEMPORARY STORAGE UNIT 14 and ARTICLE ENTRY/WITHDRAWAL SENSOR 16, the latter providing its output over line 16a as an input to CPU (central processor unit) 18. A second input to CPU 18 is the output of BAR CODE SCANNER 20, provided over line 20a.

Third inputs to CPU 18 are contents of ENTERED ARTICLE BAR CODE MEMORY 22, provided over lines 22a, and contents of WITHDRAWN ARTICLE BAR CODE MEMORY 24, provided over lines 24a. CPU 18 itself furnishes decoded bar codes for storage in memories 22 and 24, also over lines 22a and 24a, as obtained from scanner 20.

SCAN DEMANDER 26, which may be any form of alerting device, such as a beeper or voice message reproducer, receives input from CPU 18 over line 26a, for purposes below discussed in connection with the flow charts of FIGS. 2 and 3.

SHOPPING LIST/INVENTORY COMPILER 28, also referred to herein as a print store, is a memory unit receiving signals for storage from CPU 18 over lines 28i a. PRINTER/DISPLAY 30 comprises any suitable printing device or CRT display, as desired, for either providing a permanent printout or a screen showing of the contents of compiler 28 received over lines 28a.

USER DEMAND INPUT 32 may be constituted by a keyboard or other input switching device and furnishes input to CPU 18 over lines 32. As discussed below, a user can demand either a printing/display of a shopping list or of an inventory of the contents of storage unit 14.

Figure 2:
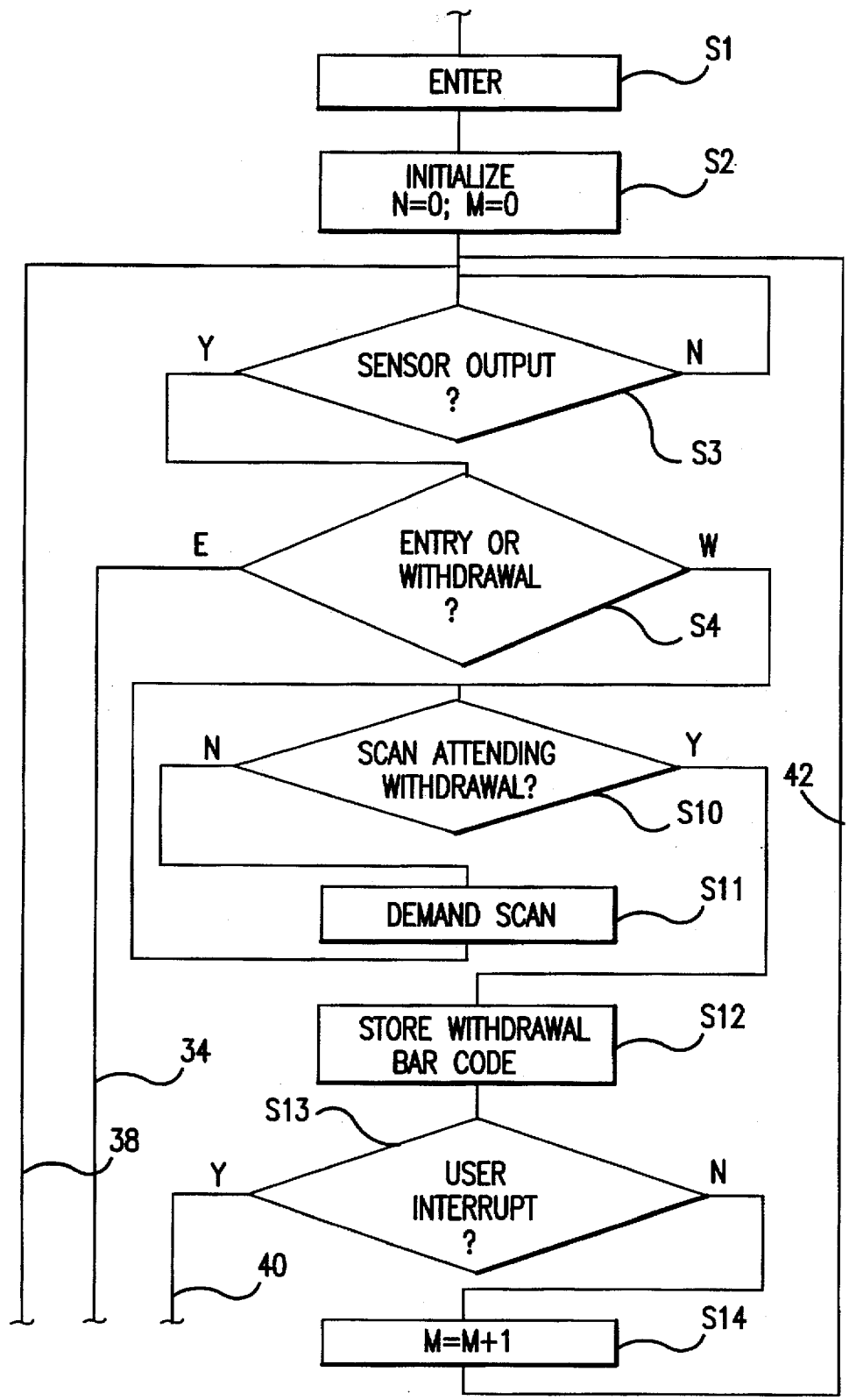
FIGS. 2, 3, 4 and 5 are flow charts indicative of a program implemented by the CPU of the FIG. 1 system.

Referring to FIG. 2, CPU 18 implements a program corresponding to the illustrated flow chart, which commences with step S1, ENTER. In step S2, INITIALIZE N=0; M=0, constants N (number of articles entered into storage unit 14) and M (number of articles withdrawn from storage unit 14) are set to zero. In this connection, storage unit 14 is physically initialized, i.e., it is either empty or its contents are removed.

In step S3, ? SENSOR OUTPUT, CPU 18 constantly monitors the output line 16a of sensor 16. Where there is no sensor output (N), the system cycles at step S3. Where there is a sensor output (Y), progress is to step S4, ? ENTRY OR WITHDRAWAL.

Sensor 16 may comprise a series of LED and photocell pairs arranged longitudinally along an axis of entry/withdrawal. If interiorly disposed photocells first change their outputs by light beam interruption, CPU 18 recognizes the event as an article withdrawal. Conversely, if exteriorly disposed photocells first change their outputs by light beam interruption, CPU 18 recognizes the event as an article entry. Step S4 provides output E (entry) on line 34 in the latter event. Since storage unit 14 must first be filled with scanned articles, the latter event is assumed and progress is to step S5, ? SCAN ATTENDING ENTRY, of FIG. 3.

If the user has failed to scan the article upon entry thereof into storage unit 14, the inquiry of step S5 is answered in the negative and progress is to step S6, DEMAND SCAN, and CPU 18 calls for beeping or like alerting indication, e.g., a voice message, to call for the user to scan the article, and returns to step S5.

Upon the user scanning the article, the inquiry of step S5 is answered in the affirmative and progress is to step S7, STORE ENTRY BAR CODE.

In step S8, ? USER INTERRUPT, CPU 18 looks to input unit line 32a to determine whether the user has made demand for a shopping list or inventory reading. If the step S8 inquiry is affirmatively answered, progress is over line 36 to the flow chart of FIG. 4. If the inquiry is answered in the negative, progress is to step S9, N=N+1, and an entry article register is incremented to take account of the activity. Progress is then over line 38 to step S3 of FIG. 2.

In the event that step S4 provides output W (withdrawal), progress is to step S10, ? SCAN ATTENDING WITHDRAWAL.

If the user has failed to scan the article upon withdrawal from storage unit 14, the inquiry of step S10 is answered in the negative and progress is to step S11, DEMAND SCAN, and CPU 18 calls, as in the above case, for beeping or like alerting indication, e.g., a voice message, to call for the user to scan the article, and returns to step S10.

Upon the user scanning the article, the inquiry of step S10 is answered in the affirmative and progress is to step S12, STORE WITHDRAWAL BAR CODE. While not indicated in the flow chart, CPU 18 concurrently erases the withdrawn article bar code from memory 22.

In step S13, ? USER INTERRUPT, CPU 18, as above, looks to input unit line 32a to determine whether the user has made demand for a shopping list or inventory reading. If the step S13 inquiry is affirmatively answered, progress is over line 40 to the flow chart of FIG. 4. If the inquiry is answered in the negative, progress is to step S14, M=M+1, and a withdrawal article register is incremented to take account of the activity. Progress is then over line 42 to step S3 of FIG. 2.

Figure 3:
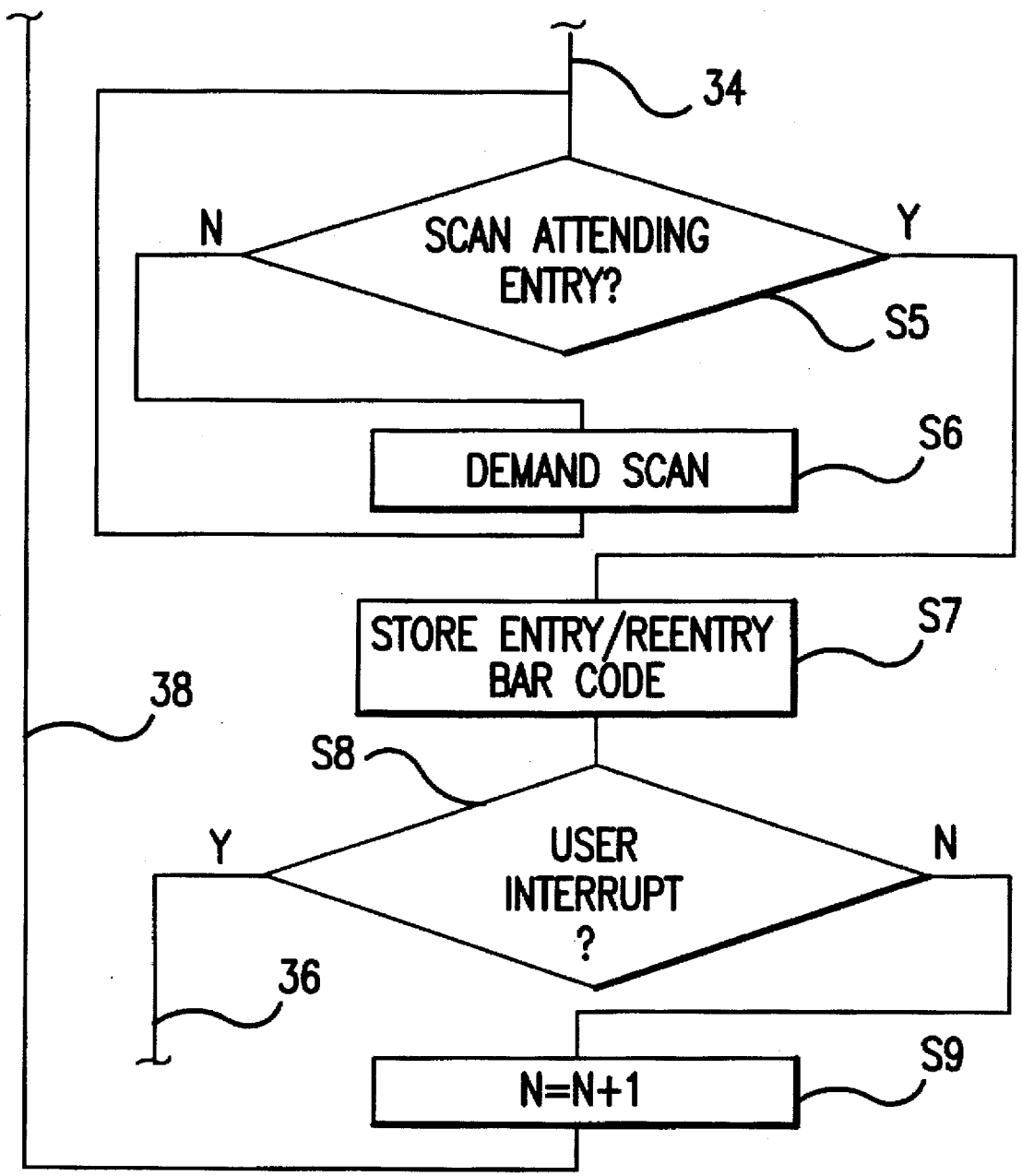
Figure 4:
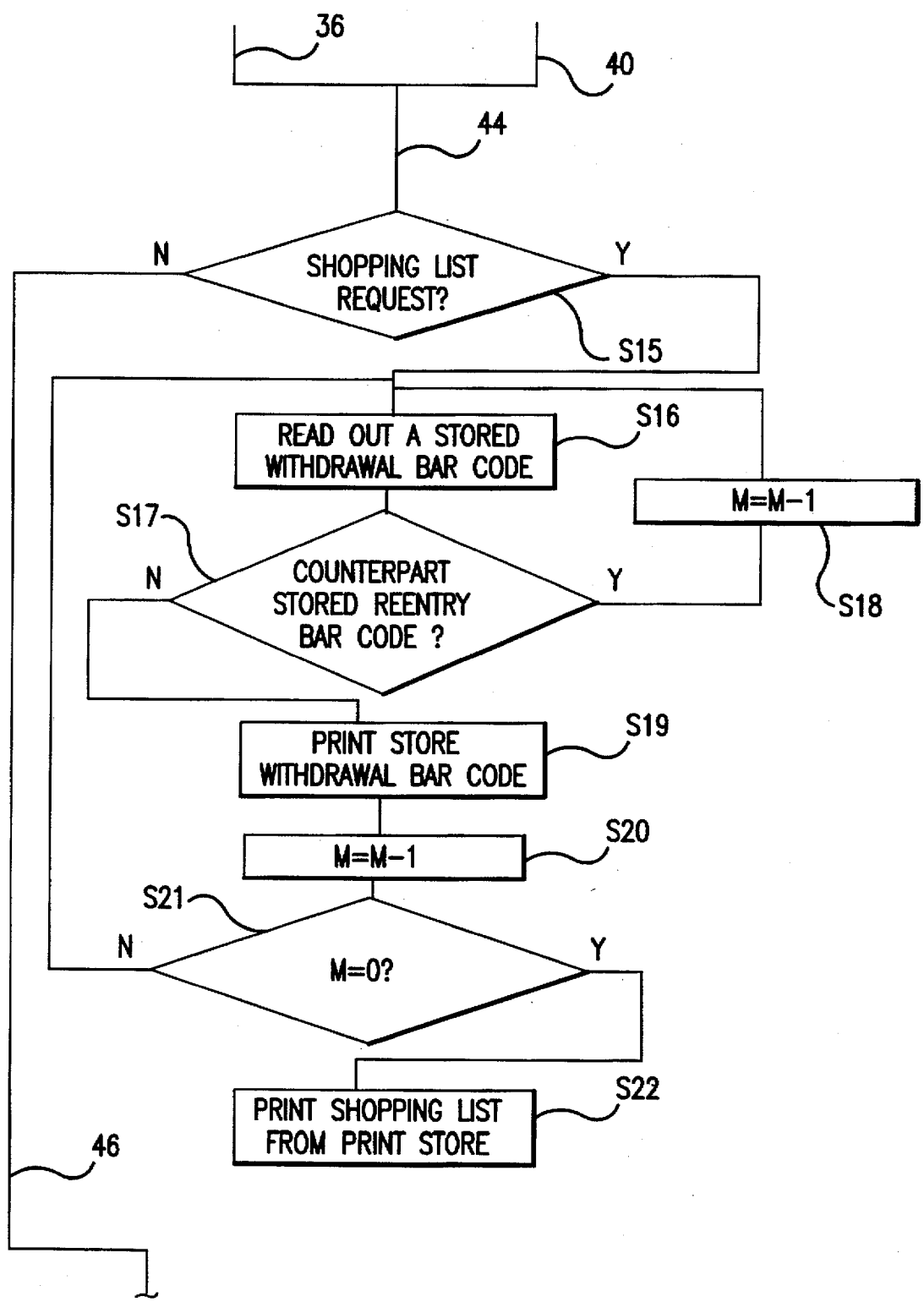

Turning to FIG. 4, lines 36 of FIG. 3 and 40 of FIG. 2 both lead to line 44 and to step S15, ? SHOPPING LIST REQUEST. If the user has not requested the same, progress is over line 46 to the flow chart of FIG. 5. If the inquiry of step S15 is answered in the affirmative, progress is to step S16, READ OUT A STORED WITHDRAWAL BAR CODE.

In step S17, ? COUNTERPART STORED REENTRY BAR CODE, CPU 18 determines whether storage unit 14 is depleted as respects the withdrawal bar code article or whether is has been returned following withdrawal. In the latter case, step S17 is affirmatively answered and progress is to step S18, M=M−1, decrementing the withdrawal article register, and return is to step S16.

Where the step 17 inquiry is answered in the negative, progress is to step S19, PRINT STORE WITHDRAWAL BAR CODE. In step S20, M=M−1, decrementing the withdrawal article register, and progress is to step S21, ? M=0. If the withdrawal article register is not at zero, return is made to step S16. If the article register is at zero, progress is to step S22, PRINT SHOPPING LIST FROM PRINT STORE, wherein a printed list is provided identifying articles corresponding to the bar codes compiled in repeated practices of step S19.

Figure 5:
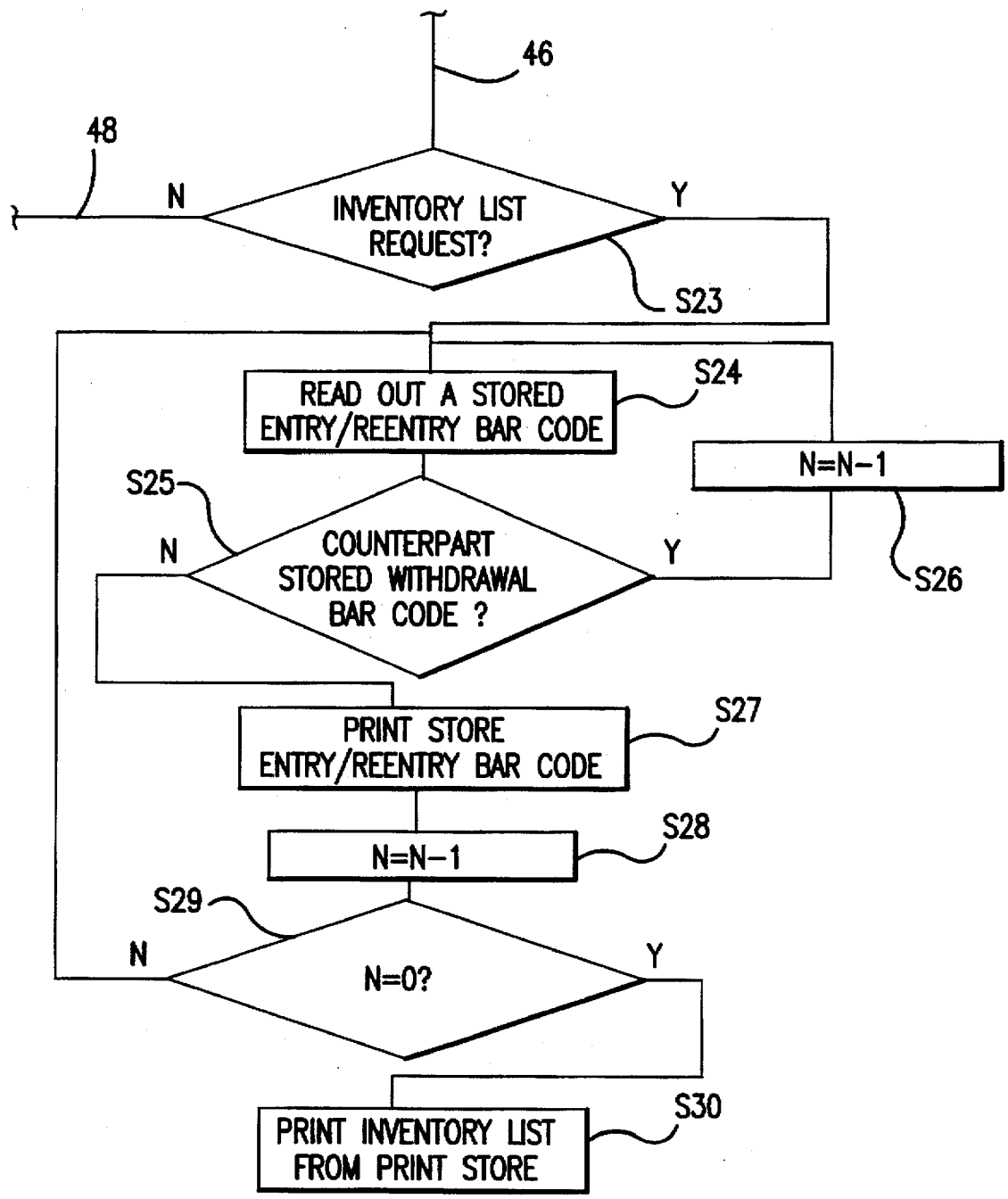

Turning to FIG. 5, line 36 of FIG. 4 leads to step S23, ? INVENTORY LIST REQUEST. If the user has not requested the same, progress is over line 48 to provide indication to the user of error, since the exemplary system and methods described does not provide a third user choice. If the inquiry of step S23 is answered in the affirmative, progress is to step S24, READ OUT A STORED ENTRY/ REENTRY BAR CODE.

In step S25, ? COUNTERPART STORED WITHDRAWAL BAR CODE, CPU 18 determines whether storage unit 14 is depleted as respects the entry bar code article or whether is has been returned following withdrawal. In the latter case, step S25 is affirmatively answered and progress is to step S26, N=N−1, decrementing the entry article register, and return is to step S24.

Where the step 25 inquiry is answered in the negative, progress is to step S27, PRINT STORE ENTRY BAR CODE. In step S28, N=N−1, decrementing the entry article register, and progress is to step S29, ? N=0. If the entry article register is not at zero, return is made to step S24. If the article register is at zero, progress is to step S30, PRINT INVENTORY LIST FROM PRINT STORE, wherein a printed list is provided identifying articles corresponding to the bar codes compiled in repeated practices of step S27.

By way of summary and introduction to the ensuing method claims, reference is made to the above outset discussion of the method. As respects summary and introduction to the ensuing method claims, the invention provides a system for on-premise processing of articles bearing bar codes, the system comprising an on-premise unit for releasable containment of the articles, means for scanning the bar codes of articles withdrawn from and entered into the on-premise unit and providing first and second output signals respectively indicative of scanned bar codes of withdrawn articles and of entered articles, means for storing the first and second scanning means output signals and means for comparing the stored first scanning means output signals with the second stored scanning means output signals.

The system further includes compiling means for compiling selective of the first and second stored scanning means output signals responsively to the comparing results of the comparing means. Further, the system provides one of a printout and a display of articles corresponding to in the scanning means output signals compiled by the compiling means.

The system includes sensing means for sensing article withdrawal from and entry into the on-premise unit and providing output signals respectively indicative of commodity withdrawal and entry. The storing means is operative to differently store the first and second scanning means output signals in response to the output signals of the sensing means.

The system further includes means for providing output alerting indication when the sensing means provides an output signal for a given article and the scanning means provides neither of the first and second scanning means output signals for the given article.

Figure 6:
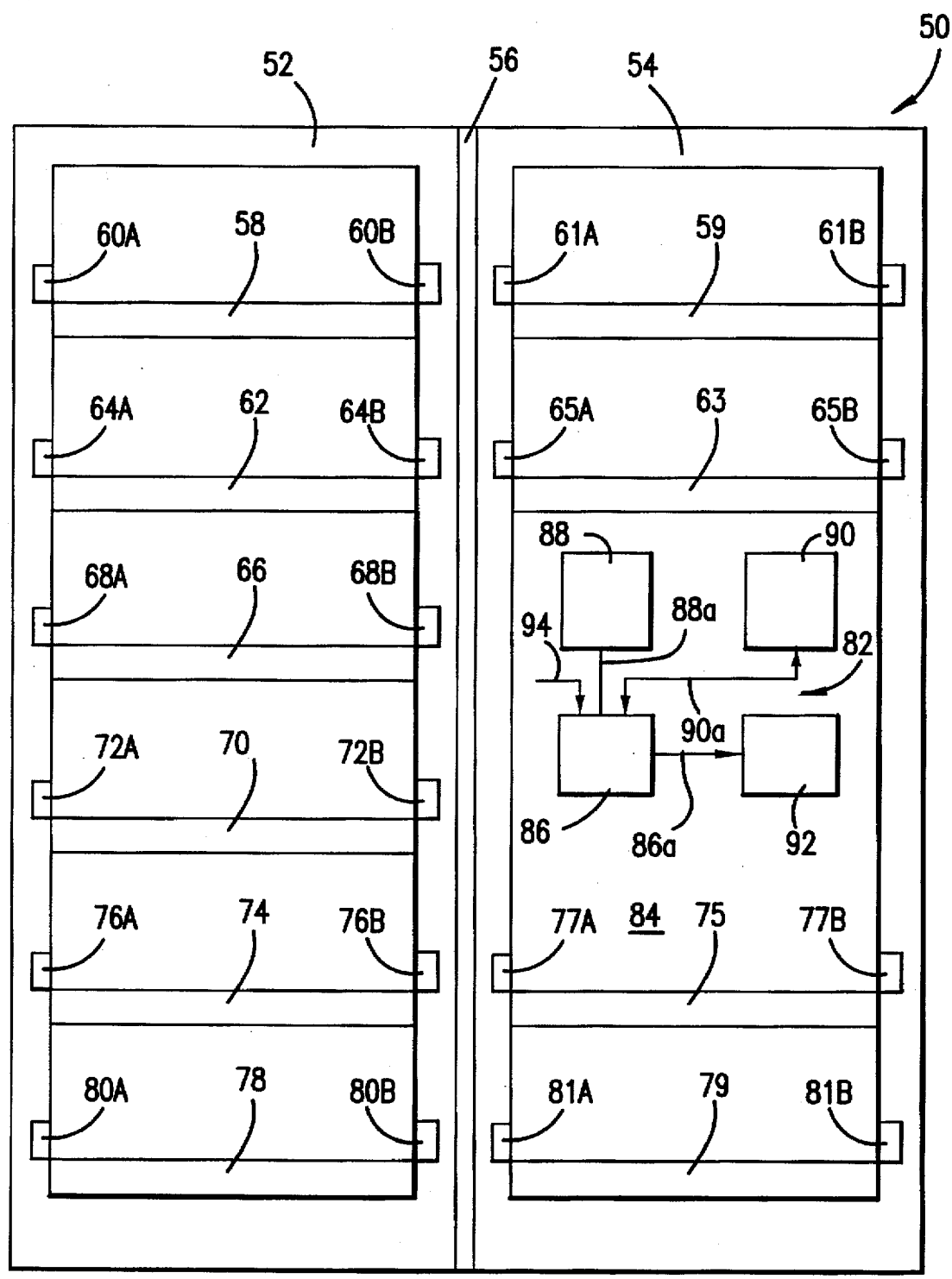
FIG. 6 is a front elevation of a refrigerator equipped in accordance with the invention.
Figure 7:
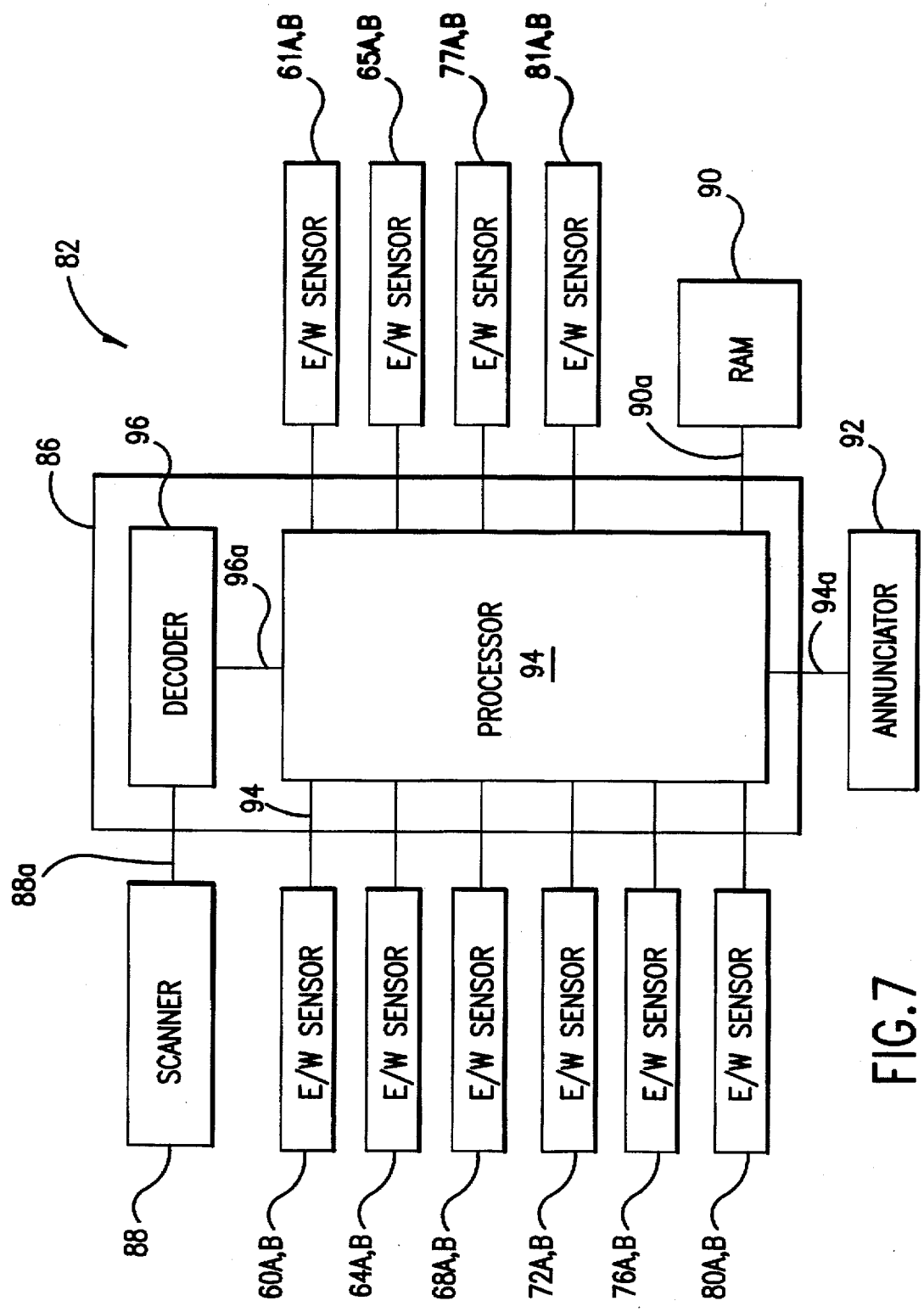
FIG. 7 is functional block diagram of system of the refrigerator of FIG. 6.

Turning to FIGS. 6 and 7, refrigerator 50 has article containment cabinet 52 and door 54 with hinge 56 supporting the door for opening and closing. Shelves 58, 62, 66, 70 and 74 have article entry/withdrawal (E/W) sensors 60, 64, 68, 72 and 76 associated respectively therewith. Door 54 has shelves 78, 80 82 and 84 with components of a refrigerator system disposed on the door at user level. The system components include control unit 86, SCANNER 88, RAM 90 and ANNUNCIATOR 92. Control unit 86 includes PROCESSOR 94 and DECODER 96.

SCANNER 88 provides its output signals over lines 88a to DECODER 96, which in turn provides its output signals over lines 96a as a first input to PROCESSOR 94. Second inputs to PROCESSOR 94 are output signals of E/W SENSORS 60, 64, 68, and 76 provided on lines 60a, 64a, 68a, 72a and 76a, which are indicated collectively by the letter A in FIG. 6. PROCESSOR 94 is connected with RAM 90 over lines 90a and with ANNUNCIATOR 92 over lines 94a. Sensors 60, 64, 68, 72 and 76 may be configured as above noted for sensor 16 of the FIG. 1 system.

Figure 8:
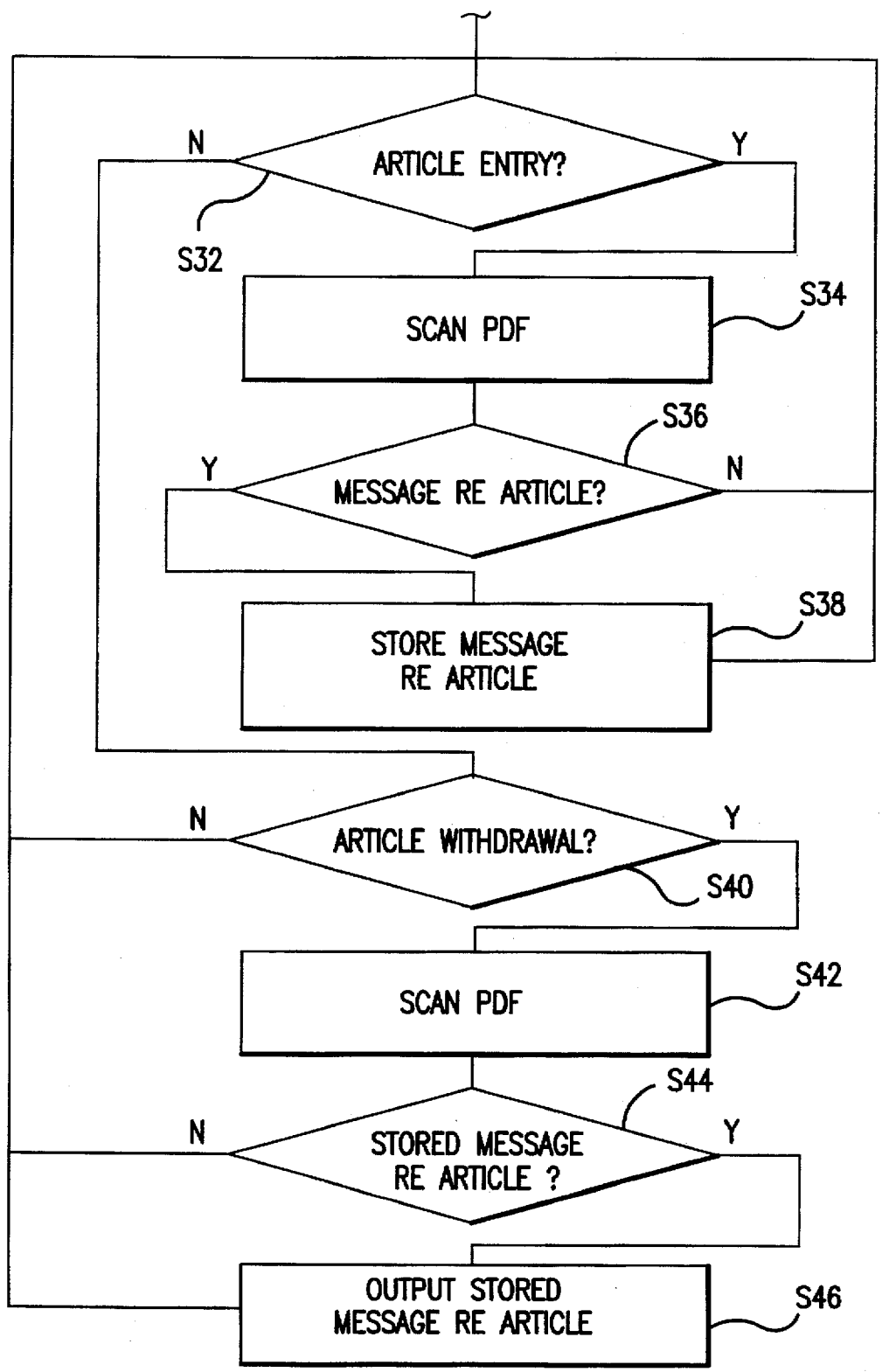
FIG. 8 is a flow chart indicative of a program implemented by the processor of the FIG. 7 system.

Referring to the flow chart of FIG. 8, if the inquiry of step S32, ? ARTICLE ENTRY, is answered in the affirmative, progress is to step S34, SCAN PDF, the portable data file is scanned by SCANNER 88 and decoded by DECODER 96 and furnished to PROCESSOR 94. In step S36, ? MESSAGE RE ARTICLE, the processor determines whether the scanned PDF contains a message, such as an expiration date for the article and a verbal message for the user, and if so, progress is to step S38, STORE MESSAGE RE ARTICLE, where the processor writes the message, with article identification, in RAM 90.

If the reply to the step S32 inquiry is negative, progress is to step S40, ? ARTICLE WITHDRAWAL. If that inquiry is answered in the negative, return is to step S32. If affirmative, progress is to step S42, SCAN PDF, where the article PDF is scanned and inquiry is made in step S44, ? STORED MESSAGE RE ARTICLE. Here, the processor consults RAM 90 and, if a message is not stored, return is to step S32. If a message is stored, the processor reads the same from RAM 90. Progress is then to step S46, OUTPUT STORED MESSAGE RE ARTICLE, where the processor calls for audibilization of the message through ANNUNCIATOR 92 and return to step S32.

The flow chart of FIG. 8 may be expanded to include the user participation compelling steps and other facets of the flow charts previously discussed.

Figure 9:
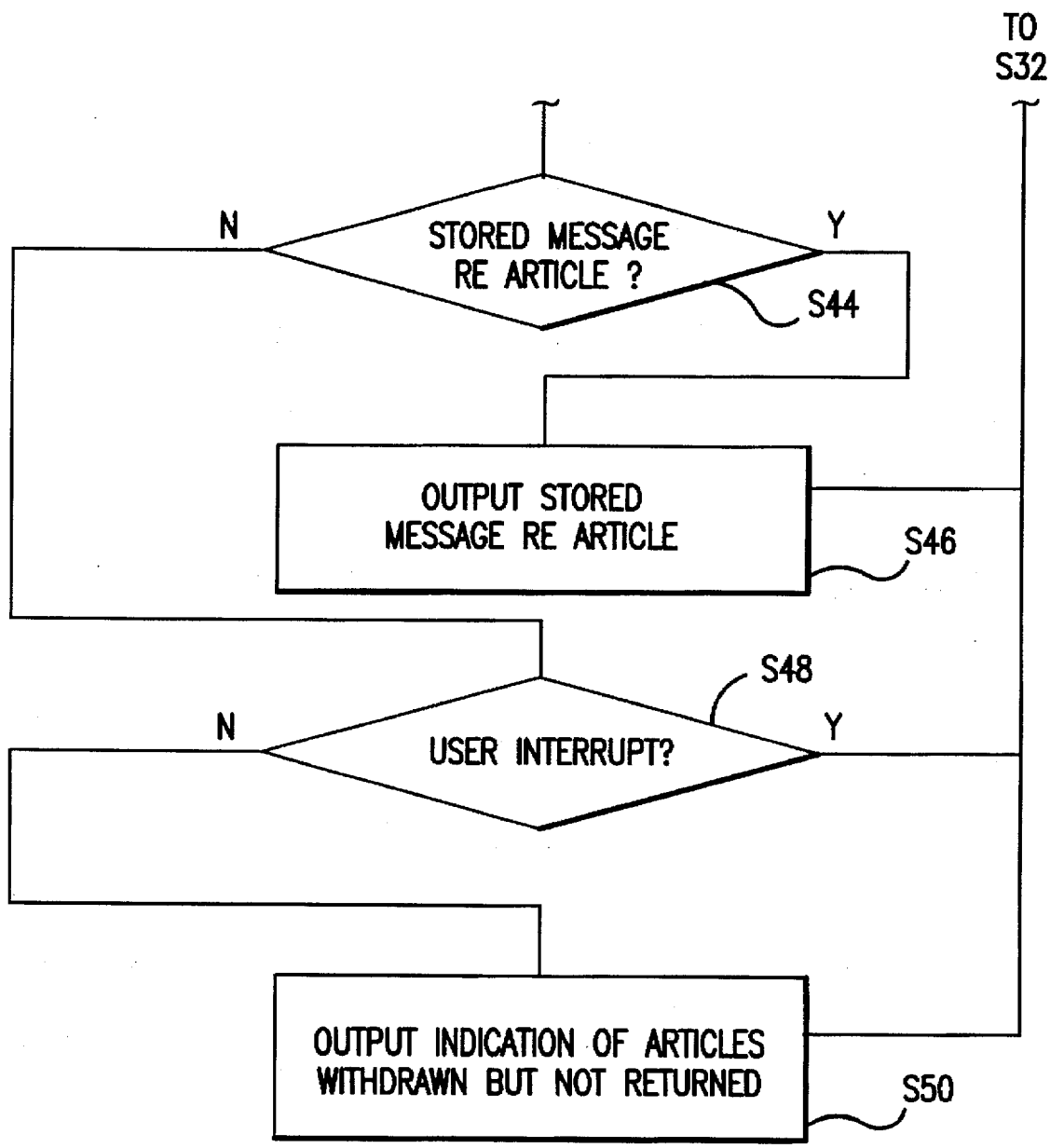
FIG. 9 is a variation of the FIG. 8 flow chart.

FIG. 9 shows a flow chart of a further program for use in the invention, adopting steps S32 through S42 and step S46, but modifying practice of step S44. On negative answer to the inquiry of step 44, progress is to step S48, ? USER INTERRUPT, wherein inquiry is made as to whether the user requests inventory shorts information. On negative answer to the inquiry, progress is to step S32 of FIG. 8. On affirmative reply, progress is to step S50, OUTPUT INDICATION OF ARTICLES WITHDRAWN BUT NOT RETURNED. In this step, the processor compares contents of separate entry/reentry memories and withdraw memories, as in the case of FIG. 4 above, and audibilizes the identification of articles found in the withdraw memory and not found in the entry/reentry memory.

By way of summary of the foregoing second embodiment of the invention and introduction to the claims addressing the same, it will be seen to provide, in combination, an on-premise unit for releasable containment of articles bearing two-dimensionally encoded bar code symbols, scanning means disposed with the on-premise unit for reading the article symbols and providing output signals indicative of the article symbols and decoding means with the on-premise unit for decoding the output signals of the scanning means and providing decoding means output signals.

The arrangement preferable further includes processing means with the on-premise unit for processing the decoding means output signals and providing processing means output signals and annunciator means with the on-premise unit for providing audible messages upon receipt of the processing means output signals.

Various methods are afforded. One is a method for on-premise processing of articles bearing two-dimensionally encoded bar codes comprising the steps of defining an on-premise unit for releasable containment of the articles, providing the on-premise unit with a scanner which can scan two-dimensionally encoded bar codes and a decoder for decoding signals provided by the scanner and providing the on-premise unit with a facility for storing information decoded by the decoder and for providing audible renditions of stored information.

A second is a method for on-premise processing of articles bearing two-dimensionally encoded bar codes inclusive of article identification and a message relating to the article, comprising the steps of defining an on-premise unit for releasable containment of the articles scanning and storing the bar codes of articles on initial entry thereof into the unit, scanning the bar codes of articles withdrawn from the unit and audibilizing stored messages relating to articles responsively to the scanning of the sensible of articles withdrawn from the unit.

A third is a method for on-premise processing of articles bearing two-dimensionally encoded bar codes inclusive of article identification and a message relating to the article, comprising the steps of defining an on-premise unit for releasable containment of the articles, scanning and storing the bar codes of articles on entry and reentry thereof into the unit, scanning and storing the sensible of articles withdrawn from the unit and audibilizing stored identifications of articles withdrawn from the unit and not returned to the unit responsively to user request.

While several embodiments and variations of the present invention for a consumer's on-premise article control and use processing system and method are described in detail herein, it should be apparent that the disclosure and teachings of the present invention will suggest many alternative designs to those skilled in the art.

What is claimed is:

1. A method for processing of consumable articles bearing bar code symbols indicative of their character, said method comprising the steps of:

(a) defining a set of storage units comprising at least a refrigerator and a pantry for releasable containment of said articles;

(b) sensing article entry and article withdrawal from each of said units;

(c) providing sensing output based upon the sensing of article entry and article withdrawal from each of said units;

(d) scanning and storing the bar codes of articles on initial entry thereof into each of said units;

(e) scanning and storing the bar codes of articles withdrawn from each of said units;

(f) scanning and storing the bar codes of articles entered into each of said units following withdrawal from each of said units; and (g) providing output indication of failure of correspondence between the stored bar codes resulting from entry and withdrawal of articles from each of said units;

whereby steps (d), (e) and (f) are practiced in part by providing separate storage facilities for scanned bar codes respectively in article entry and withdrawal, and step (g) is practiced by reading out a stored bar code from one of said separate storage facilities and determining whether the read out bar code is stored in the other of said separate storage facilities.

2. A system for processing of consumable articles bearing bar code symbols indicative of their character, said system comprising:

(a) a set of storage units comprising at least a refrigerator and a pantry for releasable containment of said articles;

(b) sensing means for sensing article entry and article withdrawal from each of said units;

(c) means for providing sensing output signals based upon the sensing of article entry and article withdrawal from each of said units;

(d) means for scanning the bar codes of articles withdrawn from and entered into each of said units and providing first and second output signals respectively indicative of scanned bar codes of withdrawn articles and of entered articles;

(e) means for storing said first and second scanning means output signals;

(f) means for comparing said stored first scanning means output signals with said second stored scanning means output signals and producing comparison results; and (g) compiling means for selective compiling of said first and second stored scanning means output signals in response to comparison results produced by said comparing means.

3. The system claimed in claim 2, further including means for providing one of a printout and a display of articles corresponding to said scanning means output signals compiled by said compiling means.

* * * * *